United States Patent
Herchl et al.

(10) Patent No.: US 12,371,856 B2
(45) Date of Patent: Jul. 29, 2025

(54) PROCESS FOR PREPARING A BROKEN-UP, CELLULOSE-CONTAINING, STARTING MATERIAL WITH A PREDEFINED FIBRE-LENGTH DISTRIBUTION

(71) Applicant: LENZING AKTIENGESELLSCHAFT, Lenzing (AT)

(72) Inventors: Richard Herchl, Ried im Innkreis (AT); Christian Weilach, Vöcklabruck (AT)

(73) Assignee: LENZING AKTIENGESELLSCHAFT, Lenzing (AT)

( * ) Notice: Subject to any disclaimer, the term of this patent is extended or adjusted under 35 U.S.C. 154(b) by 323 days.

(21) Appl. No.: 17/596,100

(22) PCT Filed: May 29, 2020

(86) PCT No.: PCT/EP2020/065045
§ 371 (c)(1),
(2) Date: Dec. 2, 2021

(87) PCT Pub. No.: WO2020/245056
PCT Pub. Date: Dec. 10, 2020

(65) Prior Publication Data
US 2022/0243396 A1   Aug. 4, 2022

(30) Foreign Application Priority Data
Jun. 4, 2019 (EP) ..................... 19178193

(51) Int. Cl.
*D21C 5/00* (2006.01)
*C08J 11/16* (2006.01)
(Continued)

(52) U.S. Cl.
CPC ............... *D21C 5/00* (2013.01); *C08J 11/16* (2013.01); *D21C 3/02* (2013.01); *D21C 9/007* (2013.01);
(Continued)

(58) Field of Classification Search
CPC ... D21C 5/00; D21C 3/02; D21C 9/007; C08J 11/16; B29B 17/02; B29B 2017/0296
See application file for complete search history.

(56) References Cited

U.S. PATENT DOCUMENTS

| 4,378,381 A | 3/1983 | Turbak et al. |
| 6,379,594 B1 | 4/2002 | Döpfner et al. |

(Continued)

FOREIGN PATENT DOCUMENTS

| CN | 103339322 A | * 10/2013 | ............... C08L 1/02 |
| CN | 107189044 A | 9/2017 | |

(Continued)

OTHER PUBLICATIONS

Palme et al., Development of an efficient route for combined recycling of PET and cotton from mixed fabrics, 2017, Textiles and Clothing Sustainability, 3:4. (Year: 2017).*

(Continued)

*Primary Examiner* — Anthony Calandra
(74) *Attorney, Agent, or Firm* — Womble Bond Dickinson (US) LLP

(57) ABSTRACT

A method for providing a treated cellulose-comprising starting material (110), in particular a starting material for forming a, in particular regenerated, cellulosic molded body (102) is described. The method comprises: i) supplying a cellulose-comprising starting material (101) which comprises cellulosic fibers, and treating (20) the cellulose-comprising starting material (101), to obtain the treated cellulose-comprising starting material (110), such that the
(Continued)

cellulose fibers of the treated cellulose-comprising starting material (110) comprises a predetermined fiber length distribution. Furthermore, a method for manufacturing a cellulosic molded body (102), a treated cellulose-comprising starting material (110), and a use of used textiles are described.

10 Claims, 4 Drawing Sheets

(51) Int. Cl.
  *D21C 3/02* (2006.01)
  *D21C 9/00* (2006.01)
(52) U.S. Cl.
  CPC ........... *C08J 2301/02* (2013.01); *Y02W 30/64* (2015.05); *Y02W 30/66* (2015.05)

(56) References Cited

U.S. PATENT DOCUMENTS

| | | | |
|---|---|---|---|
| 2003/0121629 A1* | 7/2003 | Hu | D21H 27/38 162/123 |
| 2014/0343196 A1 | 11/2014 | Kousaka et al. | |
| 2015/0107789 A1* | 4/2015 | Ni | D21H 17/005 162/55 |
| 2015/0291762 A1* | 10/2015 | Watanabe | D01F 6/00 428/401 |
| 2016/0220932 A1 | 4/2016 | Probst et al. | |
| 2016/0257814 A1 | 9/2016 | Schade et al. | |
| 2018/0056553 A1 | 3/2018 | Ohtani et al. | |
| 2018/0282921 A1 | 10/2018 | Carlyle et al. | |
| 2020/0190280 A1 | 6/2020 | Lin et al. | |

FOREIGN PATENT DOCUMENTS

| | | | | |
|---|---|---|---|---|
| CN | 107234703 A * | 10/2017 | | B27N 3/002 |
| EP | 0051230 A1 | 10/1981 | | |
| EP | 0402866 A2 | 12/1990 | | |
| EP | 0726356 A1 | 8/1996 | | |
| EP | 2325148 A1 * | 5/2011 | | C04B 26/02 |
| EP | 2457714 A1 | 5/2012 | | |
| EP | 2 922 905 A1 | 9/2015 | | |
| EP | 3 049 563 A1 | 8/2016 | | |
| TW | 201329138 A1 | 7/2013 | | |
| TW | 201702041 A | 1/2017 | | |
| WO | WO 2008/078247 A2 | 7/2008 | | |
| WO | 20100079062 A2 | 7/2010 | | |
| WO | 2010149711 A2 | 12/2010 | | |
| WO | 2011051882 A1 | 5/2011 | | |
| WO | 2011055148 A1 | 5/2011 | | |
| WO | WO 2012/042146 A1 | 4/2012 | | |
| WO | WO-2012054968 A1 * | 5/2012 | | C08L 1/02 |
| WO | WO-2012070616 A1 * | 5/2012 | | B29B 15/10 |
| WO | WO 2014/081291 A1 | 5/2014 | | |
| WO | WO 2015/044894 A1 | 4/2015 | | |
| WO | WO 2015/052028 A1 | 4/2015 | | |
| WO | WO-2016018360 A1 * | 2/2016 | | D21H 15/00 |

OTHER PUBLICATIONS

Nanko et al., The World of Market Pulp, 20056, WOMP LLC, p. 246-247,250-251 (Year: 2005).*
English Machine Translation o fCN107234703A, 2017. (Year: 2017).*
English machine translation of CN107234703A1, 2017. (Year: 2017).*
English Machine translation of CN103339322A,2013. (Year: 2013).*
Second Chinese Office action for Application No. 202080039728.9, dated Nov. 9, 2023, 22 pages.
Chinese Office action for Patent Application 202080039728.9, dated May 31, 2023, 13 pages.
International Search Report of corresponding PCT/EP2020/065042, Sep. 8, 2020, 7 pages.
European Search Report of corresponding EP 19 178 193.9, Nov. 13, 2019, 12 pages.
Written Opinion of corresponding PCT/EP2020/065042, Sep. 8, 2020, 8 pages.
"Process for pretreating reclaimed cotton fibres to be used in the production of moulded bodies from regenerated cellulose," Research Disclosure, Kenneth Mason Publications, Hampshire, UK, GB, vol. 609, No. 40, Jan. 1, 2015, 14 pages.
Fourth Chinese Office action for Application No. 202080039728.9, dated Apr. 11, 2024, 36 pages.
Wypych, George, Fillers Handbook, Second edition, Beijing: China Petrochemical, Oct. 31, 2002, 8 pages.
Jingao, Shin, Fishing mesh and antifouling technology, Donghua University Press, Oct. 31, 2011, 12 pages.
Chinese Office action for Application No. 202080039728.9 dated Jul. 9, 2024, 67 pages.
"Spinning and Weaving of Chemical Fibers, Second Series", Shanghai Textile Research Institute, pp. 77-85, date of disclosure Jul. 1964, China.
Taiwanese Office Action and Search Report for Application No. 113107669, dated Jul. 31, 2024, 14 pages.

* cited by examiner

PROCESS FOR PREPARING A BROKEN-UP, CELLULOSE-CONTAINING, STARTING MATERIAL WITH A PREDEFINED FIBRE-LENGTH DISTRIBUTION

CROSS-REFERENCE TO RELATED APPLICATION(S)

This application is a national US phase of PCT/EP2020/065045 which claims the benefit of the filing date of European Patent Application No. 19 178 193.9 filed 4 Jun. 2019, the disclosure of which is hereby incorporated herein by reference.

TECHNICAL FIELD

Embodiments of the invention relate to a method for providing a treated cellulose-comprising starting material, in particular a starting material for forming a cellulosic molded body. Furthermore, embodiments of the invention relate to a method for manufacturing a (regenerated) cellulosic molded body from the treated cellulose-comprising starting material. Furthermore, embodiments of the invention relate to the treated cellulose-comprising starting material. Moreover, embodiments of the invention relate to a use of treated used textiles for manufacturing the cellulosic molded body. In particular, embodiments of the invention relate to a treated cellulose-comprising starting material with a predetermined fiber length distribution.

Thus, embodiments of the invention may relate to the technical field of providing treated, cellulose-containing starting materials. In particular, embodiments of the invention may relate to the technical field of manufacturing a (regenerated) cellulosic molded body from a treated, cellulose-containing starting material. Furthermore, embodiments of the invention may relate to the technical field of recycling foreign matters, in particular used textiles.

Technological Background

A cellulose-comprising treated starting material, such as pulp, may serve as base material for the manufacture of cellulosic molded bodies. These molded bodies may be fibers (e.g. lyocell fibers or viscose fibers) or also a paper tissue, for example. At first, for this purpose, a cellulose-comprising starting material is treated. This starting material may be wood, used paper, or used textiles, for example. Treating may encompass mechanically and/or chemically separating constituents of the starting material. The treated starting material, e.g. pulp, may then consist of fibers, which may be supplied to a further manufacturing method. Thus, the pulp may be supplied to a subsequent process, for example when manufacturing a spinning mass (for a viscose method and/or a lyocell method), as a suspension via pumps and valves.

However, problems may arise, which are mainly caused by the length of the fibers. In the case of used textiles as starting material, they comprise in addition to cellulose fibers, mostly in the form of cotton fibers, also synthetic fibers, such as polyester. Native cotton has a fiber length of approximately 40 mm, while polyester is manufactured as endless filament and is then cut to staple fibers with an adjustable fiber length. By these especially long (cellulose) fibers, cloggings in the used aggregates (plants) may occur during a treatment process. On the other hand, if the fibers are too short, they may produce much dust. However, at the same time, very short fibers also comprise a large surface and may thus be difficult to dehydrate, after they once have absorbed a liquid medium. Furthermore, short fibers may be unintentionally separated, which may lead to a loss of material and to environmental pollution.

In the case of long fibers, in particular so-called "plaits" (German: Verzopfungen) may occur, which are balls of fibers which may be generated, when fibers are winding around each other. This may occur in particular at constrictions or dead zones in pipelines, but also in pumps or valves. These fiber balls may lead to cloggings in the conduits during a manufacturing process (e.g. a lyocell method), which in turn is associated with a high manual cleaning effort. In addition, in a further use of the fibers (e.g. as the spinning mass for manufacturing lyocell fibers), when the fibers are too long, it may happen that they are not completely solved in a given reaction time, whereby a significantly increased filtration effort for the spinning mass results. Correspondingly, the production costs are significantly increased, while at the same time the quality of the product to be manufactured is reduced.

In contrast to this, too short fibers comprise a much too large surface, such that they are only difficultly dehydratable, whereby solvents may not be efficiently removed. Furthermore, especially short fibers or very small fiber particles (fine matter) may be washed out in treatment processes via wastewaters. A considerable material loss may occur. Furthermore, an increased load of the wastewaters with fiber wastes may be caused. Correspondingly, conventional solutions are also associated with high additional production costs (in particular by the material loss), while additionally a less resource-saving and less ecological production type is present.

SUMMARY OF THE INVENTION

There may be a need to provide a cellulose-comprising treated starting material (e.g. for manufacturing a (regenerated) cellulosic molded body) in an efficient, robust, and resource-saving manner.

The subject matters according to the independent patent claims are provided. Preferred embodiments result from the dependent patent claims.

According to an aspect of the present invention, a method for providing a treated cellulose-comprising starting material (in particular a starting material for forming a (further in particular regenerated) cellulosic molded body) is described. The method comprises: i) supplying (in particular presorting and/or comminuting) a cellulose-comprising starting material (e.g. used textiles, wastepaper, wood), which comprises cellulosic fibers, and ii) treating (encompassing e.g. comminuting, boiling, singularizing, shortening of fibers, selectively separating of fibers) of the cellulose-comprising starting material, to obtain the treated cellulose-comprising starting material (e.g. a pulp), such that the cellulose fibers of the treated cellulose-comprising starting material comprise a predetermined fiber length distribution.

According to a further aspect of the present invention, a method of manufacturing a (in particular regenerated) cellulosic molded body is described. The method comprises i) providing a cellulose-comprising treated starting material as described above, and ii) forming a cellulosic molded body from the cellulose-comprising treated starting material (e.g. by a lyocell method or a viscose method).

According to a further aspect of the present invention, a cellulose-comprising treated starting material for manufacturing a cellulosic molded body is described. The cellulose-comprising treated starting material comprises an average length-weighted fiber length in the range 0.75 to 2.5 mm, in particular 0.9 to 1.75 mm, further in particular 1.0 to 1.5 mm.

According to a further aspect of the present invention, a use of treated used textiles with an average length-weighted fiber length in the range 0.75 to 2.5 mm, in particular 0.9 to 1.75 mm, further in particular 1.0 to 1.5 mm for manufacturing a cellulosic molded body is described.

In the context of this document, the term "cellulose" may in particular denote an organic compound which is a constituent of plant cell walls or may be synthetically manufactured. Cellulose is a polysaccharide (i.e. a polysaccharide). Cellulose is unbranched and typically comprises multiple hundred up to ten thousands β-D-glucose molecules (β-1,4 glycosidic bond) and cellubiose-units, respectively. From cellulose molecules, cellulose fibers are built by plants in a controlled manner. With a technical process, glucose molecules may be agglomerated under formation of regenerated fibers, for example as tearproof fibers.

In the context of this document, the term "molded body" may in particular denote a two- or three-dimensional geometric body which is a result of a method for manufacturing and recovering, respectively, of cellulose. In particular, molded body may denote a two- or three-dimensional object which comprises or consists of cellulose and is manufactured from solved pulp. In particular, molded bodies may be lyocell-molded bodies, viscose-molded bodies, modal-molded bodies, or paper-molded bodies (paper tissue). Typical molded bodies are filaments, fibers, sponges and/or films. Basically, all types of cellulose molded bodies are suitable for embodiments of the invention. Both, endless filaments and cut staple fibers with conventional dimensions (for example 38 mm length) and short fibers are denoted as fibers. For manufacturing fibers, both, methods with withdrawing units subsequently to one or more extrusion jets, and other methods, such as in particular melt-blowing-methods, may be used. Alternatively to fibers, also a cellulose-comprising foil may be manufactured as molded body, i.e. a planar and substantially homogenous film with or made of cellulose. In particular, foils may be manufactured by adjusting the process parameters of a lyocell method, such that coagulating is triggered at least partially only after an impingement of the filaments on a receiving surface. Foils may denote planar cellulose molded bodies, wherein the thickness of these foils is adjustable (for example by selecting a number of serially arranged jet bars). Other embodiments of a molded body are a tissue and a fleece made of cellulose filaments and made of cellulose fibers, respectively, in particular a spinning fleece made of integrally merged ("merging") substantially continuous cellulose filaments ("melt blown"). A tissue may in particular denote a textile planar web made of at least two crossed (preferably in a perpendicular or almost perpendicular manner) thread systems (or fiber systems), wherein threads (or fibers) in the longitudinal direction may be denoted as warp threads and threads (or fibers) in the cross direction may be denoted as weft threads. A fleece or nonwoven may be denoted as orderless web (which is in particular present in tangles) made of filaments or fibers or cut yarns of a restricted length, which are merged (in particular in a frictionally engaged manner) to a fiber layer or a fiber gauze. A molded body may also be created in the shape of a sphere. Also cellulose-comprising particles, in particular such as beads (i.e. a granulate and spheres, respectively) or flakes may be provided as molded bodies, which may be further treated in this form. Possible cellulose molded bodies are also particulate structures, such as granulate, spherical powder or fibrids. A shaping of a molded body is preferably performed by an extrusion of a cellulose-containing spinning solution through an extrusion nozzle, since in this way large amounts of the cellulose molded bodies with a very uniform shape may be manufactured. A further possible cellulose molded body is a sponge or, more general, a porous molded body. According to exemplary embodiments, the mentioned molded bodies may be used for manufacturing yarns, textiles, gels, paper, cardboard, filters, or composite materials, for example.

In the context of this document, the term "lyocell-method" in particular may denote a method for manufacturing cellulose according to a direct-solvent method. The cellulose for the lyocell-method may be obtained from a starting material which comprises this cellulose. In the lyocell-method, the starting material may be solved in a suitable solvent (in particular comprising tertiary amine oxides, such as N-methylmorpholine-N-oxide (NMMO) and/or ionic liquids, i.e. low melting salts, which are made of cations and anions). In particular, solving may be performed by dehydration and/or without chemical modification. In the lyocell-method, the obtained solution, which may also be denoted as dope or spinning solution, may subsequently be pressed through one or more spinning jets. Filaments which are formed thereby may be precipitated during and/or after their free or controlled fall through an air gap in a water-containing bath (in particular in a bath with aqueous NMMO-solution) and/or in air humidity which is present in the air gap.

Lyocell denotes a cellulose-comprising type of regenerated fiber which is manufactured according to a direct-solvent method. The cellulose for the lyocell-method is extracted from a raw material (e.g. wood, used textiles). The thus obtained pulp may subsequently be solved in N-methylmorpholine-N-oxide (NMMO), a solvent, by dehydration without chemical modification, filtered, and subsequently pressed through spinning nozzles. The filaments which are formed in this way are precipitated after passing an air gap in a bath with aqueous NMMO-solution, and are subsequently cut, e.g. to staple fibers.

In the context of this document, the term "viscose method" may in particular denote a method for manufacturing cellulose according to a wet spinning method. For the viscose method, the cellulose may be obtained from a starting material (in particular wood or a wood pulp) which comprises this cellulose.

In the context of this document, the term "viscose method" may denote a xanthogenate method. In the viscose method, which is performed as xanthogenate method, in subsequent process stages, the starting material may at first be treated with a base (for example with caustic soda lye), whereby alkali cellulose is formed. In a subsequent conversion of this alkali cellulose with carbon disulfide, cellulose-xanthogenate is formed. From this, by adding a base (in particular caustic soda lye), a viscose-spinning solution may be generated which may be pressed through one or more spinning nozzles. In a spinning bath, viscose-filaments are generated by coagulation. The thus manufactured viscose-filaments are subsequently cut, e.g. to viscose-staple fibers.

In the context of this document, the term "viscose method" may also denote a carbamate method, wherein instead of carbon disulfide ammonia is used for manufacturing a soluble cellulose derivate. Instead of the cellulose-xanthogenate, the so-called cellulose-carbamate is generated. Analog to the further use of the cellulose-xanthogenate, from the cellulose-carbamate, a spinnable solution is manufactured from which, after pressing through one or more spinning nozzles, cellulose-filaments may be regenerated in a spinning bath.

Furthermore, in the context of this document, the term "viscose method" may also denote a cold alkaline method, wherein cellulose is solved without further derivatizing to the xenthogenate or carbamate in a tempered, in particular cooled, aqueous alkaline medium. In an embodiment, the temperature of the aqueous alkaline medium is less than 20° C., in particular also less than 5° C. For improving the solving behavior, additives may be added to the aqueous alkaline medium, such as urea, thio urea, zinc oxide, polyethylene glycol, or tensides. Again, from the cellulose-containing spinning solution, cellulose-filaments are regenerated after passing through one or more spinning nozzles, by precipitating in an acidic or alkaline spinning bath.

Chemical fibers and regenerated fibers, respectively, are denoted as viscose fibers, which are manufactured by a wet spinning method which is called viscose method (in particular a xanthogenate method, a carbamate method, or a cold alkaline method). The starting raw material of the viscose method is a highly pure cellulose in form of chemical pulp.

In the context of this document, the term "remains from a clothing manufacture" may in particular denote rejects and/or cutting waste (German: Verschnitt) of a textile or yarn which comprises or consists of cellulose, wherein these remains occur during a method for manufacturing clothing. When manufacturing clothing, for example a cellulose-comprising textile is manufactured as starting material, from which planar portions (for example with a shape of a T-shirt half) are subsequently cut. Remains remain, which, according to an exemplary embodiment, may be resupplied to a method for manufacturing a cellulose-comprising molded body. Thus, residues from a clothing manufacture may be a starting material which comprises or consists of cellulose, which may be used for a recovery of cellulose, before a user has used the remains as clothing or in another way. In particular, remains from a clothing manufacture may substantially be made of pure cellulose, in particular without foreign matters which are separate and do not comprise cellulose (such as buttons, textile print or seams).

In the context of this document, the term "used clothes" may in particular denote cellulose-comprising clothing or home textiles (e.g bed clothes) which are already used (in particular worn) by a user when recovering at least a part of the cellulose. Thus, used clothes may be a cellulose-comprising starting material which may (but does not have to) comprise significant amounts of foreign matters, and may be used for recovering cellulose, after a user has used the used clothes as clothing or in another way. In particular, used clothes may be made of a mixture of cellulose and one or more foreign matters, in particular comprising (in particular in clothing frequently used) synthetic plastic (such as polyester and/or elastane) and/or foreign matters which are separate and do not comprise cellulose (such as buttons, textile print or seams). Polyester in particular denotes polymers with ester functions (R—[—CO—O—]—R) in their main chain. Polycarbonates and polyethylene terephthalate belong to polyesters. Elastane in particular denotes a stretchable chemical fiber with a high elasticity. A block copolymer on which elastane is based may contain a mass portion of at least 85% polyurethane.

In the context of this document, the term "used textiles" may denote both "used clothes" and "remains from a clothing manufacture".

In the context of this document, the term "textiles" may denote both "new textiles" and "used clothes" and "remains from a clothing manufacture".

The term "new textiles" encompasses textile raw materials (natural fibers, chemical fibers), and non-textile raw materials which were treated by one or more methods to line-, plane-shaped, or spatial products. The term "new textiles" may correspond to the term "rejects from the clothing manufacture", and may also denote finished products (e.g. clothes, bed clothes), wherein the latter was substantially not used/worn by a user yet. In an embodiment, it is differentiated between used textiles and new textiles. In another embodiment, the term used textiles may also encompass these new textiles (finished textile products which are not used may be also denoted as used textiles and/or clothing rejects).

In the context of this document, the term "paper manufacture" may in particular denote, that from a cellulose-containing and treated starting material, a cellulosic molded body is formed, which is a paper tissue. A "paper tissue" may be denoted as paper starting material in this context, from which a paper product, such as a paper, a cardboard, a filter or the like may be formed. A paper tissue may be a composite material which contains at least pulp (cellulose) and a binder. A "paper tissue" may also encompass paper or materials which are similar to paper, such as cardboard, filter material, isolation mats, absorbing fleeces, fiber reinforced planar materials etc. Paper tissue may be formed by dehydration of a fiber suspension, e.g. on a sieve. A paper tissue may be a planar material (fiber fleece) which substantially consists of (cellulose-) fibers. The paper tissue may be further compacted and dried in following process stages. All treating stages which lead from a cellulosic molded body to a paper tissue may therefore be denoted as paper manufacture methods. Furthermore, also all treating stages which lead from a cellulosic molded body to a paper, and from a paper tissue to a paper product, respectively, may be denoted as paper manufacture.

In the context of this document, the term "treating" may in particular denote, that an incoming starting material is processed (treated), such that an outgoing, treated starting material in its chemical/physical properties and in its material composition, respectively, at least partially differs from the incoming starting material. A treatment process may encompass the stage of comminuting a starting material, e.g. a shredding of used textiles. Moreover, a treatment process may comprise singularizing and cutting cellulose fibers. During a treatment process, for example a boiling process, in particular an alkaline boiling, may be performed. Furthermore, during a treatment process, synthetic fibers, such as polyester, may be depleted from the cellulose (by boiling), for example. Moreover, a treatment process may also encompass mechanical separation stages, such as density separation. Alternatively or additionally to the boiling process, e.g. synthetic fibers or other foreign matters may therefore be mechanically removed. Moreover, treating may encompass a shortening of cellulose fibers to a predetermined fiber length distribution.

In the context of this document, the term "predetermined fiber length distribution" may in particular denote, that the lengths of (cellulose) fibers in the treated starting material are substantially in a predetermined (i.e. intentionally selected) range. The term "fiber length" may relate to the length of cellulose fibers, but also to the length of synthetic fibers (plastic). Moreover, the term "length distribution" may relate to an average value (mean value) of the fiber length (length-weighted), for example. This average value may be in a determined and predefined, respectively, length range. It may for example be predetermined, that the average length-weighted fiber length is in the range 0.75-2.5 mm. Furthermore, it may also be predetermined, that a certain amount (e.g. a determined percentage) of the fibers fulfills a determined length condition. For example, it may be determined, that the amount of fibers which have a length below 0.2 mm must not be higher than 11% of the treated starting material.

According to an exemplary embodiment of the invention, a cellulose-comprising treated starting material (e.g. for manufacturing a (regenerated) cellulosic molded body) is provided in an especially efficient, resource-saving and durable manner, when the process conditions of the treating are adjusted, such that the treated starting material (e.g. pulp) comprises a predetermined fiber length distribution. The predetermined fiber length distribution may be adjusted exactly such that desired and advantageous properties of the treated starting material are promoted. While conventionally only the fiber length of a manufactured cellulosic molded body was adjusted (e.g. staple fibers), it has surprisingly turned out, that adjusting an exactly defined fiber length distribution already in a starting material for manufacturing the cellulosic molded body (thus some process stages upstream) provides a plurality of advantages when manufacturing the cellulosic molded body from the starting material.

Adjusting a certain maximum fiber length may be advantageous to prevent the above mentioned "plaits". These fiber balls may be generated, in particular when very long fibers are winding around each other. In particular, this may occur at constrictions or dead zones in supply systems and may lead to clogging there, which is associated with a high manual cleaning effort.

In contrast, adjusting a certain minimum fiber length may be advantageous to avoid material losses. In particular, especially short fibers or very small fiber particles (fine material) may be washed out during boiling-, washing-, and bleaching processes via the wastewaters. Besides the already mentioned material loss, also an increased pollution of the wastewaters arises thereby. Furthermore, it may be ensured that not too much dust is produced, and that the present fibers comprise suitable dehydration properties (i.e. not too large surfaces).

Adjusting a specific average fiber length may be in particular advantageous, to ensure a proper accessibility and wettability of the fibers with the reaction media in processes of the later further use of the treated starting material, for example as pulp when manufacturing a spinning mass (for a viscose method and/or a lyocell method). Moreover, fibers with the predetermined fiber length distribution may be completely solved in a given reaction time (e.g. in a spinning mass of a lyocell method), whereby no additional filtration effort arises.

In the following, additional embodiments of the methods, the molded body, and the use are described.

According to an embodiment, the cellulose-comprising starting material entirely or partially comprises remains from a clothing manufacture and/or used clothes. This may have the advantage, that used textiles may be recycled in a very efficient manner.

The used textiles may respectively comprise cellulose and optionally foreign matters, such as synthetic plastic, and may thus be used as cellulose-containing starting materials. Therefore, used textiles may be reused as starting materials with a (preferably) predefined composition for continuously manufacturing a (regenerated) cellulosic molded body, in particular wherein the cellulose of the regenerated molded body is present substantially in the form of lyocell fibers, viscose fibers and/or paper fibers.

In a further embodiment, a pre-sorting may be performed upstream to the treating of the material composition of the used old textiles mixture. Usually, used textiles may be delivered as a hardly definable (inhomogenous) mixture. Used textiles may be preselected by mechanically, also manually, presorting for removing completely unusable amounts of e.g. wool, metal foils, plastic fleeces, etc.

According to an embodiment, remains from a clothing manufacture may be mixed with used clothes, to provide the predefined composition. Remains from a clothing manufacture may be e.g. production waste from the industry and are thus frequently identifiable and partially homogeneous (German: sortenrein). By combining these both (recycling-) streams, an advantageous used textiles mixture may be provided. This may be especially suitable for manufacturing a cellulosic molded body, e.g. a lyocell molded body.

According to a further embodiment, treating further comprises: singularizing the cellulose-comprising starting material, such that single cellulose fibers (in particular substantially exclusively single cellulose fibers) are present. This may have the advantage, that (completely) disintegrating the starting material (e.g. used textiles to single fibers) enables especially suitably providing the predetermined fiber length distribution.

Singularizing may be achieved in a mechanical and/or chemical way. A single method may be used, or a plurality of methods may be used in combination with each other.

In an embodiment, the used textiles are comminuted, such that also a singularizing of the fibers occurs. For example, a refiner may be utilized, to achieve a singularizing of the fibers. By refiners, mainly chips, but also used textiles, may be mechanically defibered, wherein the fibers may also be mechanically treated. Chemically singularizing may be performed e.g. by boiling (e.g. alkaline boiling). This process may be also combined with separating non-cellulosic fibers (e.g. synthetic or fibers). Furthermore, the boiling process may also be combined with generating cellulose fibers with a short fiber length (by correspondingly adjusting the process parameters).

Alternatively or additionally, the fibers may be made subject to an electric field in a liquid medium. This electric field may lead to an alignment of the fibers, whereby the singularizing of the fibers may be facilitated or achieved. In a further embodiment, the starting material may be mechanically moved, e.g. shaken, such that the fibers are thereby singularized.

In an embodiment, it may be necessary to disintegrate the used textiles (substantially) completely to single fibers, wherein thereby no tissue portions are present in the starting material anymore.

According to an exemplary embodiment, completely disintegrating tissue portions may be necessary, to i) advantageously adjust fiber lengths, ii) separate different fiber types of a possible mixed tissue from each other, e.g. by mechanical methods, and iii) avoid insoluble residues in the further treating (e.g. spinning mass).

According to a further embodiment, treating further comprises: shortening (in particular cutting) the cellulose fibers (in particular the singularized cellulose fibers), such that the predetermined fiber length distribution is obtained. Additionally or alternatively, treating may further comprise: selectively separating cellulose fibers (in particular singularized cellulose fibers), which do substantially not correspond to the predetermined fiber length distribution (in particular are too short or too long). This may have the advantage, that the desired fiber length distribution may be precisely adjusted by one or more controllable process stage(s).

In a preferred embodiment, the fibers are singularized at first, to achieve an especially efficient adjusting of the desired length distribution.

According to an embodiment, the fibers are shortened to a determined length by cutting. Similar to comminuting of used textiles, e.g. guillotines, cutting mills, or cutting knives may be utilized. Cutting is performed, such that a preferred fiber length distribution is present in the treated starting material.

According to a further embodiment, the fibers may be shortened by means of a refiner. In the most simple case of a one-disk refiner, a fiber suspension is milled in a so-called milling slit between a fixed and a rotating disk. Both disks are provided with knives, cutting edges or similar acting milling bodies, whereby a shortening of the fibers occurs. Additionally to the shortening effect, also the degree of fibrillation of the fibers may be adjusted by refiners. Further embodiments of a refiner are e.g. double-disk refiners (two disks working in opposite directions) double-slit refiners, cone refiners, and cylinder refiners. Utilizing a refiner is performed, such that a preferred fiber length distribution in the treated starting material is present.

According to a further embodiment, the desired fiber length may be adjusted by means of a so-called rag-engine (German: Holländer). A rag-engine is an aggregate consisting of a tray which is configured as a true run (German: Rundlauf), and a rotating knife drum. By the motions of the knife drum on the one hand, and the fiber suspension in the true run on the other hand, the fibers may be mechanically treated.

According to an embodiment, shortening may also be performed in a chemical way. For example, the process conditions during a boiling process may be adjusted, such that the fiber length of the cellulose fibers decreases. Therefore, too long fibers may be chemically shortened to a desired length.

According to an embodiment, specifically adjusting the fiber length distribution may also encompass (selectively) removing fibers which do not correspond to the predetermined fiber length distribution. Too short and too long fibers, respectively, may be separated from the fibers with the desired fiber length by a separating method (e.g. in particular by means of slit selectors (German: Schlitzsortierer) in this way. Therefore, e.g. shorter cellulose fibers may be separated from longer cellulose fibers. Fibers, in particular too long fibers which do not correspond to the desired fiber length distribution, may then be resupplied to the fiber shortening process.

According to a further embodiment, the cellulose-comprising starting material comprises non-cellulosic foreign matters (in particular synthetic fibers), and treating further comprises: i) mechanically separating at least a part of the non-cellulosic foreign matters, and/or ii) chemically separating at least a part of the non-cellulosic foreign matters. This may have the advantage, that thoroughly depleting may be performed by known and established methods.

According to an embodiment, separating the non-fiber constituents from the fiber constituents may be performed due to different physical properties, in particular by metal deposition and/or gravitational deposition. Metallic components (for example zip fasteners, rivets, etc.) may be separated due to their magnetic properties, for example. Also the influence of the gravitational force on different constituents may be utilized for separating.

According to an embodiment, mechanically separating may be performed based on density differences between the non-cellulosic fibers and the cellulosic fibers. For example, in a centrifuge, materials of a different density may be separated due to differently strong centrifugal forces. After transferring the constituents in a liquid medium, due to different densities, they may partially collect at the surface, while other constituents are floating or deposit at the ground.

According to an embodiment, mechanically separating may be performed based on different electrostatic properties between the non-cellulosic fibers and the cellulosic fibers. Due to different electrostatic properties, the different fibers may react upon an applied electric field in a different way. This in turn enables separating the cellulosic fibers with respect to non-cellulosic fibers.

According to an embodiment, mechanically separating may comprise suspending (i.e. transferring into a suspension) the fiber constituents in a liquid medium, in particular an aqueous medium, and separating the non-cellulosic fibers from the cellulosic fibers due to different physical properties in the liquid medium (in particular different gravitational, centrifugal force-related, floating and/or electrostatic properties). Also when the different fibers in a liquid medium show a different behavior due to their different composition, this enables a separation of the different fiber constituents.

According to an embodiment, the liquid medium may comprise at least one additive for enhancing the different physical properties, in particular a dispersing agent and/or a swelling agent. In particular, a dispersing agent or dispersant may denote additives which enable or stabilize dispersing, i.e. a fine distribution of a substance (for example a fiber) in a continuous medium (for example in a liquid). In particular, a swelling agent may denote additives which promote a swelling of a substance. Swelling may denote a process, wherein a substance (in particular a liquid) introduces into a solid body and causes an enlargement of the latter. When one or more such additives are added to the medium, the discrepancies in the properties of the diverse fibers, which are necessary for the mechanical separation of the different fibers, may be increased. This increases the efficiency of the separation.

According to an embodiment, chemically separating may comprise selectively solving only at least a part of the non-cellulosic fibers or only at least a part of the cellulosic fibers in a solvent, and separating, in particular filtering, at least a part of the non-solved fiber constituents. In other words, the different fibers may be supplied to a (for example liquid, in particular aqueous) medium, in which only certain ones of these fibers, in particular selectively polyester fibers, distinctly solve, whereas other fibers, in particular cellulose fibers, show no or only a weak solving behavior. The fibers which do not solve or do not considerably solve or solve weaker (in particular cellulose fibers) may be filtered or centrifuged and may then be further treated separatedly from the solved fibers.

According to an embodiment, mechanically separating and/or chemically separating may comprise a separating of synthetic fibers as non-cellulosic fibers. In the reused textile materials, in particular used clothes and/or textile wastes residues, non-cellulosic fibers of a synthetical origin are frequently found. As example for such synthetic fibers, polyester, polyamide and/or elastane may be mentioned. These may be effectively separated from the cellulose fibers by the here described method.

According to an embodiment, chemically separating may comprise supplying an alkaline solution, in particular using oxidized agents, in particular an alkaline boiling. In particular, supplying the alkaline solution for degrading non-cellulosic fibers, in particular synthetic fibers, further in particular polyester fibers, may be performed. Especially polyester may thereby be split into water-soluble constituents which may be separated from the cellulose fibers by the wastewaters which occur in the process.

According to a further embodiment, the non-cellulosic foreign matters, in particular synthetic fibers, at least partially remain in the starting material. This may have the advantage, that certain advantageous properties (e.g. stability, stretchability, elasticity, durability) may be provided in the obtained starting material and the molded body to be manufactured, respectively. In an embodiment, synthetic fibers (e.g. polyester, but also polyurethane, in particular elastane, or polyamide) may at least partially remain in the starting material and may also be treated, such that they comprise a further predetermined fiber length distribution. The further predetermined fiber length distribution may correspond to the predetermined fiber length distribution or may be different from it.

According to a further embodiment, treating further comprises: performing a boiling process (in particular using an alkaline boiling solution). In particular, the boiling process is performed such that the cellulose fibers are singularized, and/or that the cellulose fibers of the treated cellulose-comprising starting material comprise substantially the predetermined fiber length distribution. This may provide the advantage, that robust and approved techniques may be directly applied.

When wood chips are used as solid starting material, a boiling according to the sulfite- and/or (pre-hydrolysis-) kraft process (German: Kraft Prozess) or sodium hydroxide may enable the solving of lignin, to separate it from the cellulose. When used textiles are used as solid starting material, synthetical plastic may be solved in this way, to obtain the cellulose in a form which is as pure as possible and with a desired residue concentration of polymers, respectively. In particular, a boiling process, in particular with NaOH, may lead to saponification of plastics, such as polyester, polyamide, or polyurethane.

According to a preferred embodiment, the alkaline boiling may be performed as follows: the fibers, in particular already enriched cellulosic (or mainly cellulosic) fibers, may be treated with an alkaline solution (for example sodium hydroxide or potassium hydroxide) in combination with a gaseous oxidation agent (for example 02) in a boiling apparatus (e.g. a pressure reservoir) (preferably at a pH-value of at least 9), as follows:
  a) at a temperature between 90° C. and 185° C.;
  b) for an incubation time of 45 minutes to 270 minutes;
  c) in the presence of a cellulose-stabilizing additive (for example a magnesium salt, preferably magnesium sulfate; or a chelating compound on basis of a transition metal, for example ethylenediaminetetraacetic acid (EDTA)), preferred in a concentration in a range between 0.01 weight percent and 5 weight percent with respect to the supplied fibers;
  d) at an alkaline concentration in a range between 1 weight percent and 35 weight percent with respect to the supplied fibers;
  e) at an initial gas pressure in a range of 1 bar to 21 bar (correspondingly approximately 0.1 MPa to approximately 2.1 MPa).

The generated solved pulp may subsequently be subjected to e.g. a washing procedure.

In particular, supplying the alkaline solution for degrading non-cellulosic fibers, in particular synthetic fibers, further in particular polyester fibers, may be performed. Especially polyester may thereby be split into water-soluble constituents which may be separated from the cellulose fibers by the wastewaters which occur in the process. In this procedure, polyester may be split into the monomers ethylene glycol and terephthalic acid, for example. These are water-soluble and may be separated from the cellulose fibers via process waste lyes (German: Prozessablaugen) according to an embodiment. Parallel to the polyester degradation, also cellulose degrading reactions may be executed in this boiling process.

According to an embodiment of the invention, by a suitable selection of the process parameters, the cellulose degradation may be controlled, such that a certain target degree of polymerization is adjusted. This may be advantageous, to control the fiber length and thus the fiber length distribution in a cellulose-comprising starting material. For example, especially short fibers may be specifically further shortened, to be able to separate them in a more efficient manner. Moreover, too long fibers may be chemically shortened to a preferred length in this way.

In the following, some embodiments of the predetermined fiber length distribution are described. They may provide the above described advantages for the treated starting material and also for the molded body to be manufactured.

Overview over especially advantageous predetermined fiber length distributions (all values in mm and length-weighted):

|  | Basis | Preferred | Especially preferred |
|---|---|---|---|
| Avg. fiber length in mm | 0.75-2.5 | 0.9-1.75 | 1.0-1.5 |
| Amount <0.2 mm | <11% | <8% | <5% |
| Amount >2 and > 3.5 mm | <17.5% | <12.5% | <10% |
| Amount >3.5 mm | <12.5% | <9% | <6% |

According to a further embodiment, the predetermined fiber length distribution comprises an average length-weighted fiber length in the range 0.75 to 2.5 mm, in particular 0.9 to 1.75 mm, further in particular 1.0 to 1.5 mm.

According to a further embodiment, the predetermined fiber length distribution comprises an amount of 11% or less, in particular 8% or less, further in particular 5% or less, of fibers with a length of less than 0.2 mm.

According to a further embodiment, the predetermined fiber length distribution comprises an amount of 17.5% or less, in particular 12.5% or less, further in particular 10% or less, of fibers with a length in the range 2 to 3.5 mm.

According to a further embodiment, the predetermined fiber length distribution comprises a portion of 12.5% or less, in particular 9% or less, further in particular 6% or less, of fibers with a length of more than 3.5 mm.

According to a further embodiment, the method further comprises: performing a subsequent process, in particular a bleaching process, after treating. This has the advantage, that further treatment processes may be performed downstream to treating in a flexible way.

For example, subsequent processes may encompass certain cleaning stages or drying a pulp-mass (German: Pulpe).

Furthermore, a subsequent process may encompass bleaching. The latter in particular in the case, when for manufacturing a cellulosic molded body from the treated starting material, a paper tissue is provided. Bleaching may denote a process which removes or attenuates undesired colorings. In bleaching, bleaching agents are utilized, which are oxidizing or reducing compounds, which should be at least partially selective. For example, bleaching agents may attack coloring substances by destroying chromophores. As bleaching agents, e.g. oxygen, ozone, hydrogen peroxide, chlorine-compounds (e.g. chlorine dioxide or hypochlorite), but also enzymes may be used.

Bleaching may comprise at least one of a group which is consisting of oxidative bleaching, reductive bleaching, and enzymatic bleaching. According to a preferred embodiment of the invention, bleaching may comprise performing an acidic washing, followed by performing an ozone bleaching, in turn followed by performing a peroxide bleaching. By bleaching, colorants and other chemical residual substances in the recycled textile materials may be removed.

According to a further embodiment, forming the cellulosic molded body from the treated starting material comprises one of the group which is consisting of: a lyocell method, a viscose method, a paper manufacturing method. This may have the advantage, that especially efficient and approved methods may be directly applied to the treated starting material, to manufacture a (regenerated) cellulosic molded body.

In the following, exemplary embodiments of the present invention are described in detail with reference to the following figures.

DETAILED DESCRIPTION OF EXEMPLARY EMBODIMENTS

Same or similar components in different figures are denoted with the same reference numbers.

Figure 1:
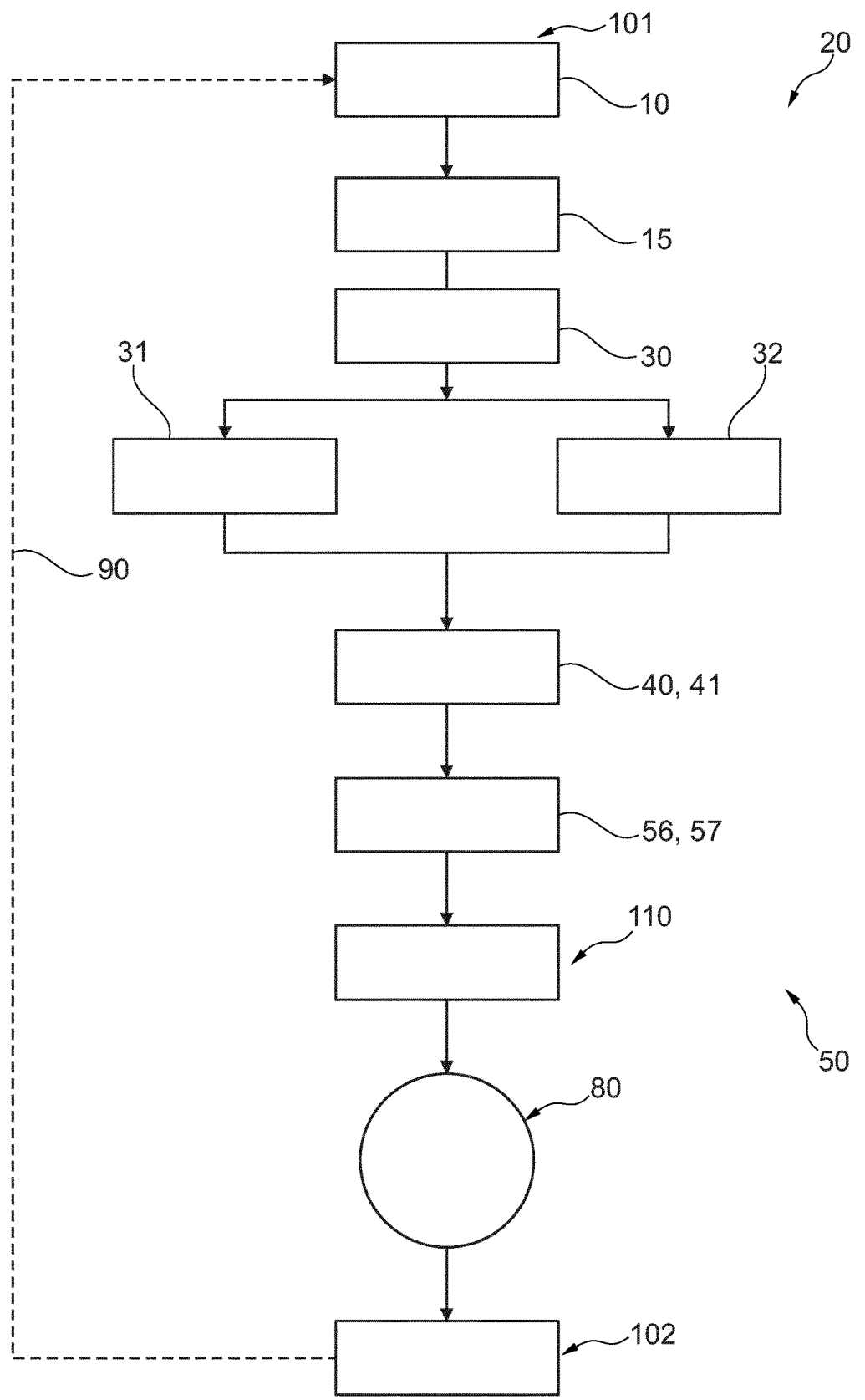
FIG. 1 shows a flow diagram of a method for providing a treated cellulose-comprising starting material according to an exemplary embodiment of the invention.

FIG. 1 shows a flow diagram of a method for providing (see reference sign 50) a treated cellulose-comprising starting material 110 according to an exemplary embodiment of the invention. At first, a cellulose-containing starting material 101 is provided, which is a mixture of used textiles (used clothes and/or remains of a clothing manufacture). It may be delivered from different sources (pre-/post-consumer) and may be partially very inhomogeneous. The used textiles as starting material 101, besides cellulose, may also comprise synthetic fibers (e.g. polyester).

The mixture of used textiles may be presorted, to provide a preferred composition. For example, cutting waste (German: Verschnitt) remains from the clothing production which comprise a composition which is substantially known, are especially suitable. Moreover, used textiles with known composition, e.g. a very high cotton content, may be added, to increase the cellulose content. Furthermore, also composition components with an at least partially known composition may be drawn from the starting material 101. For example, sportswear may be specifically removed, which comprises an especially high amount of polyester. Moreover, mechanically separating, e.g. a density separation, in particular by a flotation method, may be performed, to selectively deplete e.g. polyester and/or polypropylene from the cellulose. Fiber constituents may be suspended in a liquid (aqueous) medium. Separating the non-cellulosic fibers from the cellulosic fibers is successful due to different physical properties in the liquid medium, in particular different gravitational, centrifugal force-related, flotational and/or electrostatic properties.

In a first stage of supplying, at first, mechanically comminuting (see block 10) the used textiles 101 by shredding is performed. Thereby, mainly large non-cellulosic disturbing matters may be removed from the starting material 101, for example buttons, seams, and prints of the used clothes, which are at least partially used for generating the starting material 101.

At first, the textile material is shredded in one or more guillotines and/or cutting mills by shredding, preferably using cutting knives. Thereby, comminuted textile pieces, for example in a size range between $0.5 \times 0.5$ cm$^2$ and $10 \times 10$ cm$^2$, are obtained.

After comminuting 10, treating is performed, which is denoted with the reference sign 20 and may comprise a plurality of stages. In particular, treating 20 the cellulose-comprising starting material 101 is performed, such that the cellulose fibers of the treated cellulose-comprising starting material 110 comprise a predetermined fiber length distribution.

Mechanically comminuting 10 may be at least partially assigned to treating 20, when thereby tissue pieces of the starting material 101 are comminuted to such an extent, that also singularizing into single fibers is performed. In this way, by mechanically comminuting 10, the starting material 101 may be at least partially separated/singularized into single fibers, for example. For this purpose, a refiner may be utilized.

The mechanically comminuted starting material 101 may then be supplied to a chemical treatment process, which is an alkaline boiling 15. The boiling process 15 may fulfill multiple tasks. At first, the cellulose fibers may be treated by degrading additional materials, such as synthetic fibers (e.g. polyester) by boiling 15. Moreover, the boiling process 15 supports a singularizing of the cellulose fibers. Depending on the used process conditions, the boiling process 15 may be performed, such that the fiber length distribution is influenced. For example, too short fibers may be further shortened, to be able to separate them in a better way, or too long fibers may be shortened to a desired length.

After comminuting 10, a stage of singularizing 30 is performed at the comminuted used textiles. This may be performed at least partially by the described mechanically comminuting 10. Furthermore, further singularizing stages may be utilized. Chemically singularizing 30 may be performed (at least partially) e.g. by the above described alkaline boiling 15. Further or additionally, singularizing 30 may also encompass mechanical stages, such as shaking or teasing. Additionally, an electric field may be applied, to align the fibers (direct voltage field in a liquid medium) or the use of UV-radiation may promote singularizing 30.

In the case, that the used textiles of the starting material 101 do not only contain cellulose fibers, but also synthetic fibers, separating steps 31, 32 are performed. In the described embodiment, these separating steps 31, 32 are performed after singularizing 30 and before shortening 40 the fibers. However, the separating steps 31, 32 may be performed e.g. before comminuting and before singularizing, respectively. By mechanically separating 32, synthetic fibers, such as plastic, are separated from the cellulose fibers in a mechanical way, e.g. by density separation. By chemically separating 33, synthetic fibers, such as polyester, are separated from the cellulose fibers in a chemical way, e.g. by alkaline boiling. It may be the same boiling 15, which is utilized to singularize fibers or to separate fibers with an especially short length.

After singularizing the fibers, whereafter the cellulose-comprising starting material 101 is present substantially as single fibers, specifically adjusting the fiber length distribution (see block 40) of the singularized cellulose fibers may be performed. For this purpose, the fibers are shortened to a certain length by cutting. Similarly to comminuting 10, guillotines and/or cutting mills are utilized. Cutting is performed such that a preferred fiber length distribution in the treated starting material 110 is present. Moreover, specifically adjusting the fiber length distribution encompasses selectively separating 41 fibers which do not correspond to the predetermined fiber length distribution. Too short and too long fibers, respectively, may be separated from the fibers with the desired fiber length by a density separation (e.g. centrifuge or flotation in a suspension) in this way.

The starting material 101 may be subjected to even more treating stages. These encompass e.g. a cleaning stage (56) and a bleaching process (see 57). Subsequently, the treated cellulose-comprising starting material 110 may be provided. The correspondingly purified cellulose-comprising starting material 110 is subsequently supplied to a method for manufacturing a cellulosic molded body 102, as illustrated in block 80. An example for such a method is a lyocell method which is described in detail with reference to the FIGS. 2 and 3 (see below). The obtained molded body 102 (e.g. as a fiber in a lyocell textile) may be recycled after use again (illustrated with reference sign 90) and may be supplied to the cellulose-containing starting material 101 again.

Figure 2:
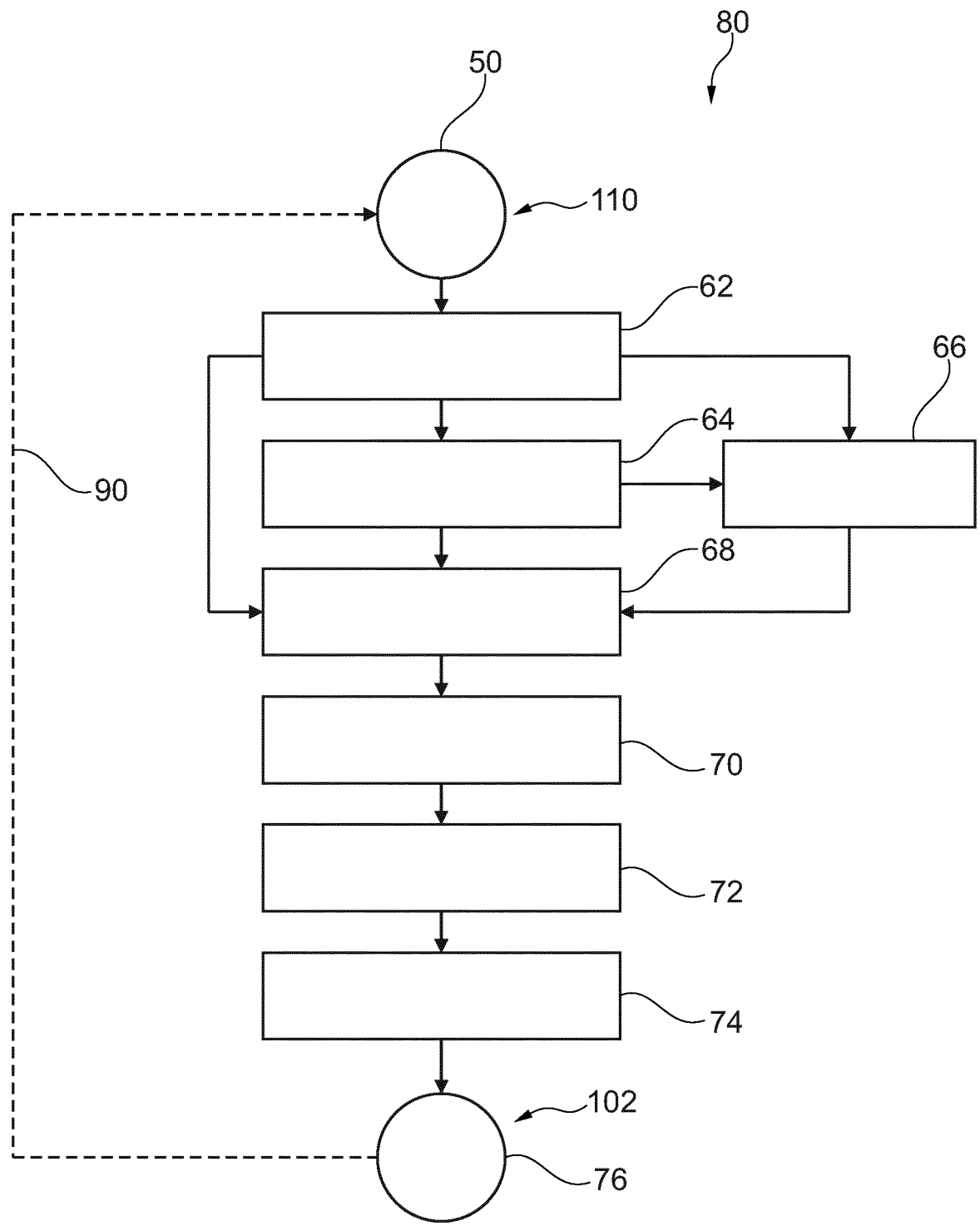
FIG. 2 shows a flow diagram of a method for manufacturing a regenerated cellulosic molded body from the treated starting material according to an exemplary embodiment of the invention.

FIG. 2 shows a flow diagram 80 of a method for manufacturing a regenerated cellulosic molded body 102 (compare FIG. 3) from the treated starting material 110, according to an exemplary embodiment of the invention.

The starting material 110 is provided by a treatment process (see block 50, compare FIG. 1). As illustrated with block 50, a such manufactured treated starting material 110 may be used for a subsequent lyocell- or viscose method, wherein the former is described in more detail in the following.

In the following, it is described, how regenerated molded bodies 102 made of cellulose may be manufactured according to an embodiment of the invention, on the basis of the cellulose-comprising starting material 110. For this purpose, the starting material 110 is supplied to an apparatus (100, see FIG. 3) for performing a lyocell-method. At first, optionally preparing (stage 62) of the treated starting material 110, e.g. cleaning or comminuting, is performed.

It is also possible (see block 64), to commonly use the cellulose-comprising starting material 110 with other cellulose-comprising materials for the subsequent lyocell-method. Thus, the starting material 110 may be mixed with a further starting material, which comprises cellulose and at least one synthetical plastic, see block 64. This supplied further starting material comprises an amount of synthetical plastics, which is different from the amount of synthetical plastic in the starting material 110. Generating the regenerated cellulosic molded body may now be performed based on the starting material 110 and the further starting material, such that the regenerated cellulosic molded body 102 contains a predetermined amount of synthetical plastic. Alternatively or additionally, the further starting material may also comprise residues from a clothing manufacture, for example.

Directly after preparing 62 and directly after mixing 64, respectively, directly solving 68 the (pure and mixed, respectively) starting material 110 in a further solvent 116 (for example tertiary amine oxides, such as N-methylmorpholine-N-oxide (NMMO)) may be performed, advantageously without chemical pretreatment. In more detail, the mechanically comminuted (and optionally mixed) starting material 110 may be directly, in particular without chemically cleaning and or adjusting the viscosity, transferred into solution. In this way, the manufacturing- and recycling method, respectively, may be performed in an especially simple and fast manner, as well as ecologically.

Alternatively, the method may comprise, after preparing 62 (or after mixing 64) and prior to solving 68, optionally chemically cleaning 66 the starting material. Such optionally cleaning 66 may comprise at least partially removing colorants by bleaching, for example. Thereby, it is possible, to partially or entirely discolor the starting material 110 prior to subsequently solving 68 the starting material 110 in a solvent 160, for example to manufacture white or grey molded bodies 102. Alternatively or additionally, in the context of optionally chemically cleaning 66, it is also possible, that the starting material 110 (prior or after its solving 68) is at least partially freed from cross-linking agents which are cross-linking the fibers of the starting material 110. In applications, in which such cross-linking agents are present between the fibers of the starting material 110, the starting material 110 may be entirely or partially freed from these cross-linking agents, for example by an alkaline or an acidic pretreatment. This additionally improves the solubility of the starting material 110. By cleaning 66, optionally at least a part of the synthetical plastic may be removed, if desired. For example, the amount of synthetical plastic in the molded body 102 to be manufactured may be adjusted and influenced, respectively, in this way.

After solving 68 the starting material 110 in a solvent (preferably NMMO), the obtained lyocell-spinning solution 104 may be pressed through one or more spinning nozzles, whereby threads and filaments, respectively, of honey-like viscosity are generated (see block 70 which concerns this spinning).

During and/or after the fall of these threads and filaments, respectively, they are brought in operational connection with an aqueous environment and thereby thinned. The concentration of the solvent 116 of these threads and filaments, respectively, is thereby reduced in an aqueous fog and an aqueous liquid bath, respectively, to such an extent, that the lyocell-spinning solution is transferred into a solid phase made of cellulose-filaments. In other words, precipitating, precipitation, or coagulating of the cellulose-filaments occurs, see reference sign 72. Thereby, a preform of the molded body 102 is obtained.

Furthermore, the method may comprise postprocessing 74 the precipitated lyocell-cellulose for obtaining the molded body 102 from the preform of the molded body 110. Such a postprocessing may encompass drying, impregnating, and/ or reshaping the obtained filaments to the final molded body 102, for example. For example, the molded body 102 may be treated by the described manufacturing method to fibers, a foil, a tissue, a fleece, a sphere, a porous sponge, or beads, and may then be supplied to a further use (see reference sign 76).

With advantage, after a use of the molded body 102, its cellulose and optional synthetical plastics may be recovered again, by performing a further method corresponding to the method stages between the reference signs 50 and 74 (see block 90). Alternatively, the cellulose and optional further synthetical plastic of the molded body 102 may be recovered in another method, for example a viscose method.

Figure 3:
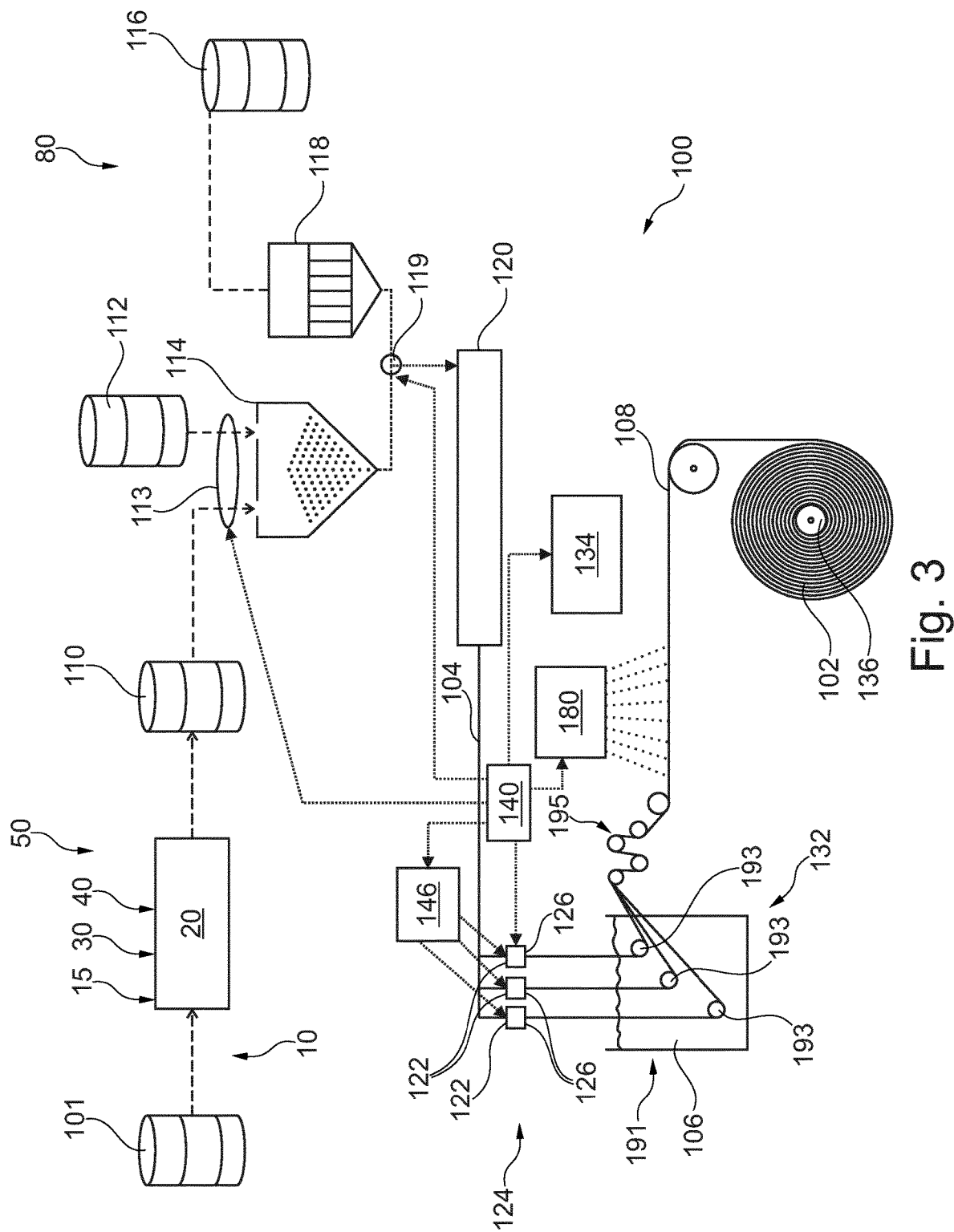
FIG. 3 shows an apparatus for providing the treated starting material and for manufacturing a regenerated cellulosic molded body by a lyocell-method from the treated starting material according to an exemplary embodiment of the invention.

FIG. 3 shows an apparatus 100 for providing a treated, cellulose-comprising starting material 110 and for manufacturing a regenerated cellulosic molded body 102 by a lyocell-method on basis of the starting material 110, according to an exemplary embodiment of the invention which is described with reference to the FIGS. 1 and 2.

Thus, FIG. 3 shows an apparatus 100 according to an exemplary embodiment of the invention for manufacturing a cellulose-comprising molded body 102, which may be manufactured in form of a fleece (nonwoven), as a fiber, a foil, a sphere, a textile tissue, a sponge, or in form of beads or flakes. According to FIG. 3, the molded body 102 is directly manufactured from a spinning solution 104. The latter is converted by a coagulation-fluid 106 (in particular made of air humidity) and/or a coagulation-bath 191 (for example a water bath which optionally comprises tertiary amine oxides, such as N-methylmorpholine-N-oxide (NMMO), to cellulose fibers 108 as molded body 102. By the apparatus 100, a lyocell-method may be performed. In this way, as molded body 102, for example substantially endless filaments or fibers 108 or mixtures of substantially endless filaments and fibers 108 of a discrete length may be manufactured. A plurality of nozzles which respectively have one or more openings 126 (which may also be denoted as spinning holes) are provided, to eject the lyocell-spinning solution 104.

As can be taken from FIG. 3, to a storage reservoir 114, via a dosing unit 113, a treated cellulose-comprising starting material 110 may be supplied to the lyocell method 18. The starting material 110 is a treated starting material 110, which was obtained in a treatment method 50, as described above for FIG. 1.

For this purpose, a cellulose-comprising starting material 101, namely used textiles, is supplied to a treatment process (see 10). Treating (see block 20) encompasses multiple stages, which encompass: i) a boiling process 115, ii) singularizing 30 the cellulose fibers of the starting material 101, such that substantially single fibers are present (singularizing 30 may also be combined with the boiling process 115), iii) shortening (cutting) 40 the singularized fibers, such that a predetermined fiber length distribution is achieved, and iv) selectively separating the cellulose fibers, which do not correspond to the predetermined fiber length distribution, and/or separating non-cellulosic fibers, e.g. synthetic fibers. After performing the treatment process 20, a treated cellulose-comprising starting material 110 is provided (see reference sign 50). This treated cellulose-comprising starting material 110 is present e.g. as pulp which is consisting of singularized cellulose fibers. These fibers in turn comprise the predetermined fiber length distribution.

According to an embodiment, a water import into the cellulose-based starting material 110 may be performed by a solvent 116 (in particular NMMO) which is described in more detail below. The cellulose-based starting material 110 itself may also already contain a certain residual humidity (dry pulp typically has a residual humidity of 5 weight percent to 8 weight percent). In particular, according to the described embodiment, the starting material 110 may be directly transferred into a mixture of water and solvent 116 without premoistening. An optional water container 112 which is shown in FIG. 3 may then be omitted.

According to an alternative embodiment, the cellulose-comprising starting material 110 may be additionally moistened, to thereby provide humid cellulose. For this purpose, water may be supplied from an optional water container 112 to the storage container 114 via the dosing unit 113. Thereby, the dosing unit 113, controlled by a control unit 140, may supply adjustable relative amounts of water and starting material 110 to the storage reservoir 114.

A suitable solvent 116, preferably tertiary amine oxides, such as N-methylmorpholine-N-oxide (NMMO), respectively an aqueous mixture of the solvent 116, for example a 76% solution of NMMO in water, is contained in a solvent container. The concentration of the solvent 116 may be adjusted in a concentration unit 118 either by adding pure solvent or water. The solvent 116 may then be mixed with the starting material 110 with definable relative amounts in a mixing unit 119. Also the mixing unit 119 may be controlled by the control unit 140. Thereby, the cellulose-comprising starting material 110 is solved in the concentrated solvent 116 in a solving unit 120 with adjustable relative amounts, whereby the lyocell-spinning solution 104 is obtained. The relative concentration ranges (also denoted as spinning windows) of the components starting material 110, water, and solvent 116 in the spinning solution 104 for manufacturing cellulosic regenerate molded bodies according to the lyocell-method, may be suitably adjusted, as known to a person skilled in the art.

The lyocell-spinning solution 104 is supplied to a fiber generation unit 125 (which may be formed with a number of spinning bars or jets 122).

When the lyocell-spinning solution 104 is guided through the openings 126 of the jets 122, it is split into a plurality of parallel threads made of lyocell-spinning solution 104. The described process flow transforms the lyocell-spinning solution 104 into increasingly long and thin threads, whose properties may be adjusted by a corresponding adjustment of the process conditions, controlled by the control unit 140. Optionally, a gas flow may accelerate the lyocell-spinning solution 104 on its way from the openings 126 to a fiber receiving unit 132.

After the lyocell-spinning solution 104 has moved through the jets 122 and further downwards, the long and thin threads of the lyocell-spinning solution 104 interact with the coagulation fluid 106.

During the interaction with the coagulation fluid 106 (for example water), the solvent concentration of the lyocell-spinning solution 104 is reduced, such that the cellulose of the starting material 110 coagulates and precipitates, respectively, at least partially as long and thin cellulose fibers 108 (which may still contain residues of solvent and water).

During or after the initial formation of the individual cellulose fibers 108 from the extruded lyocell-spinning solution 104, the cellulose fibers 108 are received at the fiber receiving unit 132. The cellulose fibers 108 may immerse into the coagulation bath 191 which is illustrated in FIG. 3 (for example a water bath, optionally comprising a solvent, such as NMMO) and may complete their precipitation when interacting with the liquid of the coagulation bath 191. Depending on the process adjustments of the coagulation, the cellulose may form cellulose fibers 108 (as shown, wherein the cellulose fibers 108 may be monolithically and integrally, respectively, merged ("merging") with each other, or may be present as separated cellulose fibers 108), or a foil and a film, respectively, made of cellulose, may be formed at the fiber receiving unit 132 (not illustrated in FIG. 3).

Thus, the cellulose fibers 108 are extruded out of the spinning nozzles of the jets 122 and are guided through the spinning bath and coagulation bath 191, respectively, (for example containing water and NMMO in low concentration for precipitation/coagulation), thereby the cellulose fibers 108 are guided around a respective redirecting roller 193 in the coagulation bath 191 and are supplied to a withdrawal galette (German: Abzugsgalette) 195 outside of the coagulation bath 191. The withdrawal galette 195 serves for a further transport and post-stretching of the cellulose fibers 108, to achieve a desired titer. Downstream of the withdrawal galette 195, the fiber bundle made of the cellulose fibers 108 is washed in a washing unit 180, if necessary scrooped (German: aviviert) and finally cut (not shown).

Although not illustrated in FIG. 3, a solvent 116 of the lyocell-spinning solution 104, which is removed from the cellulose fibers 108 during coagulation and a subsequent washing in the washing unit 180, may be at least partially recovered and recycled, respectively, and may be transferred in a subsequent cycle into the storage container 114 again.

During the transport along the fiber receiving unit 132, the molded body 102 (here in form of the cellulose fibers 108) may be washed by the washing unit 180, by the latter supplying a washing liquid for removing solvent residues. Subsequently, the molded body 102 may be dried.

Moreover, the molded body 102 may be subjected to a posttreatment, see the schematically illustrated posttreatment unit 134. For example, such a posttreatment may comprise a hydroentanglement, a needling, an impregnation, a steam treatment with a steam which is supplied under pressure, and/or a calendaring, etc.

The fiber receiving unit 132 may supply the molded body 102 to a winding unit 136, at which the molded body 102 may be wound up. The molded body 102 may then be supplied as rolling freight to an entity which manufactures products, such as wipes or textiles, on the basis of the molded body 102.

By the predetermined fiber length distribution, the treated cellulose-comprising starting material 110 comprises a proper accessibility and wettability of the fibers with the reaction media when manufacturing the spinning mass. Moreover, by the predetermined advantageous fiber length distribution, insoluble residues in the further treating of the spinning mass are avoided.

Figure 4:
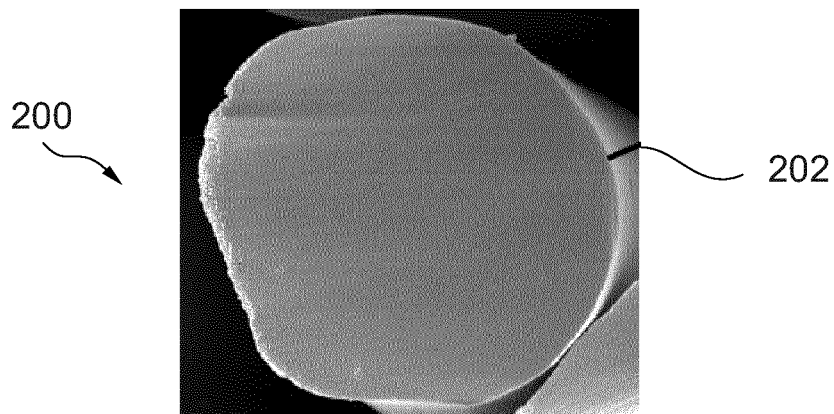
FIG. 4 shows a cellulose fiber which is manufactured by a lyocell-method.

FIG. 4 shows a cellulose fiber 200 in cross-section which is manufactured by a lyocell-method. The cellulose fiber 200 which is manufactured by a lyocell-method has a smooth round outer surface 202 and is homogenous and free of microscopic holes filled with cellulose material. Thus, it may be distinctly differentiated by a person skilled in the art from cellulose fibers which are manufactured by a viscose method (see reference sign 204 in FIG. 5) and from cellulose fibers made of cotton plants (see reference sign 206 in FIG. 6).

Figure 5:
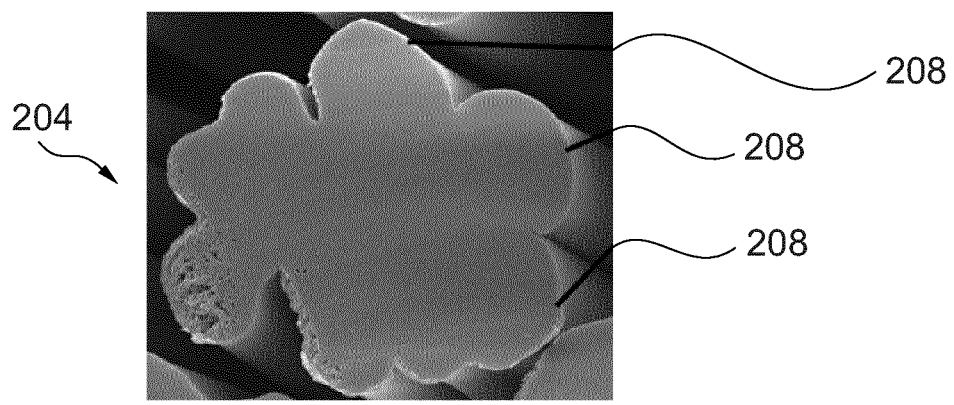
FIG. 5 shows a cellulose fiber which is manufactured by a viscose-method.

FIG. 5 shows a cellulose fiber 204 in cross-section which is manufactured by a viscose-method. The cellulose fiber 204 is cloud-shaped and comprises a plurality of arc-shaped structures 208 along its outer circumference.

Figure 6:
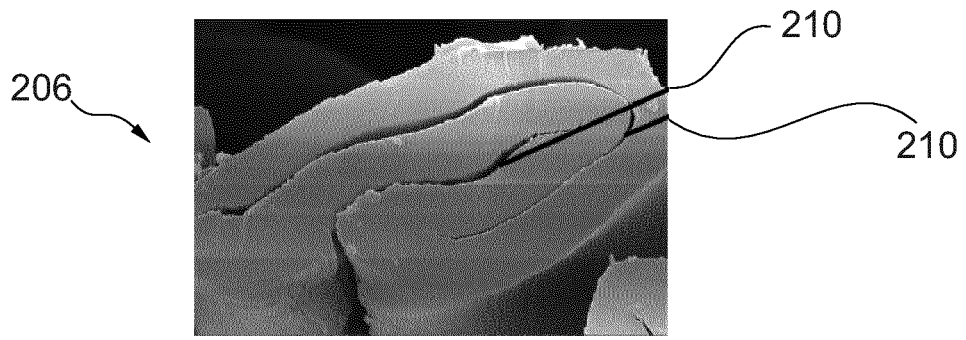
FIG. 6 shows a natural cellulose fiber from a cotton plant.

FIG. 6 shows a natural cellulose fiber 206 of a cotton plant in cross-section. The cellulose fiber 206 is kidney-shaped and comprises a lumen 210 which is free of material as fully circumferentially enclosed hollow in its interior.

By means of the significant geometrical and structural, respectively, differences of the fibers according to FIG. 4 to FIG. 6, it is possible for a person skilled in the art, for example by a microscope, to unambiguously determine, if a cellulose fiber is formed by the lyocell-method, by the viscose-method, or is naturally formed in a cotton plant.

Supplementary, it is to be noted, that "comprising" does not exclude other elements or steps, and "a" or "an" does not exclude a plurality. Furthermore, it is noted, that features or steps, which are described with reference to one of the above embodiments, may also be used in combination with other features or steps of other embodiments described above. Reference signs in the claims shall not be construed as limitation.

The invention claimed is:

1. A method of providing a treated cellulose-comprising starting material for forming a regenerated, cellulosic molded body, wherein the method comprises:
   supplying a cellulose-comprising starting material which comprises cellulosic fibers;
   wherein the cellulose-comprising starting material entirely or partially comprises remains from a reusable clothing manufacture or reusable old clothes; and
   treating the cellulose-comprising starting material, to obtain the treated cellulose-comprising starting material, such that the cellulose fibers of the treated cellulose-comprising starting material comprise a predetermined fiber length distribution;
   wherein the predetermined fiber length distribution comprises an average length-weighted fiber length in the range 0.75 to 2.5 mm; and
   wherein the predetermined fiber length distribution comprises an amount of 11% or less of fibers with a length of less than 0.2 mm.

2. The method according to claim 1, wherein the treating further comprises:
   singularizing the cellulose-comprising starting material, such that single cellulose fibers are present.

3. The method according to claim 1, wherein the treating further comprises:
   shortening the cellulose fibers such that the predetermined fiber length distribution is obtained; or
   selectively separating cellulose fibers which do not correspond to the predetermined fiber length distribution.

4. The method according to claim 1,
   wherein the cellulose-comprising starting material comprises non-cellulosic foreign matters, and wherein the treating further comprises:
   mechanically separating at least a part of the non-cellulosic foreign matters; or
   chemically separating at least a part of the non-cellulosic foreign matters.

5. The method according to claim 1, wherein the treating further comprises:
   performing a boiling process,
   wherein the boiling process is performed such that the cellulose fibers are at least partially singularized or the cellulose fibers of the treated cellulose-comprising starting material substantially comprise the predetermined fiber length distribution.

6. A method of providing a treated cellulose-comprising starting material for forming a regenerated, cellulosic molded body, wherein the method comprises:
   supplying a cellulose-comprising starting material which comprises cellulosic fibers;

wherein the cellulose-comprising starting material entirely or partially comprises remains from a reusable clothing manufacture or reusable old clothes; and treating the cellulose-comprising starting material, to obtain the treated cellulose-comprising starting material, such that the cellulose fibers of the treated cellulose-comprising starting material comprise a predetermined fiber length distribution;

wherein the predetermined fiber length distribution comprises an average length-weighted fiber length in the range 0.75 to 2.5 mm; and wherein the predetermined fiber length distribution comprises an amount of 17.5% or less of fibers with a length in the range 2 to 3.5 mm.

7. A method of providing a treated cellulose-comprising starting material for forming a regenerated, cellulosic molded body, wherein the method comprises:

supplying a cellulose-comprising starting material which comprises cellulosic fibers;

wherein the cellulose-comprising starting material entirely or partially comprises remains from a reusable clothing manufacture or reusable old clothes; and treating the cellulose-comprising starting material, to obtain the treated cellulose-comprising starting material, such that the cellulose fibers of the treated cellulose-comprising starting material comprise a predetermined fiber length distribution;

wherein the predetermined fiber length distribution comprises an average length-weighted fiber length in the range 0.75 to 2.5 mm; and wherein the predetermined fiber length distribution comprises an amount of 12.5% or less of fibers with a length of more than 3.5 mm.

8. A method of manufacturing a regenerated, cellulosic molded body, the method comprising:

providing a treated cellulose-comprising starting material by:

supplying a cellulose-comprising starting material which comprises cellulosic fibers;

wherein the cellulose-comprising starting material entirely or partially comprises remains from a reusable clothing manufacture or reusable old clothes; and treating the cellulose-comprising starting material, to obtain the treated cellulose-comprising starting material, such that the cellulose fibers of the treated cellulose-comprising starting material comprise a predetermined fiber length distribution;

wherein the predetermined fiber length distribution comprises an average length-weighted fiber length in the range 0.75 to 2.5 mm; and wherein the predetermined fiber length distribution comprises an amount of 11% or less of fibers with a length of less than 0.2 mm.; and forming the regenerated cellulosic molded body from the treated cellulose-comprising starting material.

9. The method according to claim 8, wherein forming the regenerated, cellulosic molded body from the treated cellulose-comprising starting material comprises one of the group consisting of a lyocell method, a viscose method or a paper manufacturing method.

10. The method according to claim 8, wherein the regenerated, cellulosic molded body is selected from the group consisting of a filament, a fiber, a foil, a sponge, a microsphere, a bead or a paper tissue.

* * * * *